(12) United States Patent
Ozga et al.

(10) Patent No.: US 12,105,804 B2
(45) Date of Patent: Oct. 1, 2024

(54) SECURELY EXECUTING SOFTWARE BASED ON CRYPTOGRAPHICALLY VERIFIED INSTRUCTIONS

(71) Applicant: International Business Machines Corporation, Armonk, NY (US)

(72) Inventors: Wojciech Ozga, Birmensdorf (CH); Silvio Dragone, Olten (CH)

(73) Assignee: International Business Machines Corporation, Armonk, NY (US)

(*) Notice: Subject to any disclaimer, the term of this patent is extended or adjusted under 35 U.S.C. 154(b) by 373 days.

(21) Appl. No.: 17/378,703

(22) Filed: Jul. 17, 2021

(65) Prior Publication Data

US 2023/0017231 A1    Jan. 19, 2023

(51) Int. Cl.
*G06F 21/57*    (2013.01)
*G06F 21/64*    (2013.01)
(Continued)

(52) U.S. Cl.
CPC .............. *G06F 21/57* (2013.01); *G06F 21/64* (2013.01); *H04L 9/3242* (2013.01);
(Continued)

(58) Field of Classification Search
None
See application file for complete search history.

(56) References Cited

U.S. PATENT DOCUMENTS 5,103,478 A * 4/1992 Matyas ............ G07B 17/00733
                                                                    713/172
8,549,288 B2 * 10/2013 Bade ...................... G06F 21/57
                                                                    726/22
(Continued)

FOREIGN PATENT DOCUMENTS

CN    104333450 B  * 12/2017
CN    211529155 U  *  9/2020
(Continued)

OTHER PUBLICATIONS

Drinic et al., "A Hardware-Software Platform for Intrusion Prevention," Proceedings of the 37th International Symposium on Microarchitecture (MICRO-37'04), © IEEE, 2004, 10 pgs.
(Continued)

*Primary Examiner* — Eleni A Shiferaw
*Assistant Examiner* — Ali H. Cheema
(74) *Attorney, Agent, or Firm* — Michael A. Petrocelli (57) ABSTRACT

Securely executing instructions of software on a computerized device by accessing a software of a computerized device, wherein the software includes a plurality of instructions and respective reference message authentication codes (MACs), generating a cryptographic key based at least in part on a key derivation function, wherein arguments of the key derivation function are based at least in part on a unique identifier of the computerized device and a value extended from a measurement of a content of the software of an extension mechanism of a platform configuration register of the computerized device, verifying an instruction of the plurality of instructions of the software based at least in part on the cryptographic key and a reference MAC of the respective reference MACs, and in response to verifying the instruction of the plurality of instructions of the software, executing the instruction.

22 Claims, 7 Drawing Sheets

(51) Int. Cl.
*H04L 9/32* (2006.01)
*G06F 11/14* (2006.01)
*G06F 11/30* (2006.01)
*G06F 21/52* (2013.01)
*G06F 21/54* (2013.01)

(52) U.S. Cl.
CPC ........ *H04L 9/3278* (2013.01); *G06F 11/1407* (2013.01); *G06F 11/302* (2013.01); *G06F 21/52* (2013.01); *G06F 21/54* (2013.01); *G06F 2201/865* (2013.01)

(56) References Cited

U.S. PATENT DOCUMENTS

| | | | |
|---|---|---|---|
| 8,677,142 | B2 | 3/2014 | Hodzic |
| 8,966,253 | B1 * | 2/2015 | Trimberger ......... G06F 9/30145 713/168 |
| 10,826,904 | B2 | 11/2020 | Brickell |
| 2006/0041747 | A1 * | 2/2006 | Okumura ................. H04L 9/14 713/168 |
| 2007/0220351 | A1 | 9/2007 | Jung et al. |
| 2009/0013406 | A1 * | 1/2009 | Cabuk ..................... G06F 21/57 726/22 |
| 2010/0115625 | A1 * | 5/2010 | Proudler ................. G06F 21/57 726/27 |
| 2010/0161998 | A1 * | 6/2010 | Chen ....................... G06F 21/57 713/189 |
| 2012/0272296 | A1 | 10/2012 | Hodzic |
| 2013/0061056 | A1 * | 3/2013 | Proudler ................. G06F 21/57 713/176 |
| 2015/0263855 | A1 * | 9/2015 | Schulz ................... H04L 9/0827 713/155 |
| 2015/0264021 | A1 * | 9/2015 | Schulz ............... H04L 63/0414 713/170 |
| 2016/0048678 | A1 | 2/2016 | Thom |
| 2016/0246736 | A1 | 8/2016 | Lee |
| 2016/0275461 | A1 * | 9/2016 | Sprague ............... G06Q 20/386 |
| 2017/0010881 | A1 * | 1/2017 | Kawazu .................. G06F 8/654 |
| 2017/0161071 | A1 * | 6/2017 | Pierson ............... G06F 9/30185 |
| 2018/0109372 | A1 * | 4/2018 | Fu ........................... H04L 9/083 |
| 2018/0109377 | A1 * | 4/2018 | Fu ........................ H04L 63/0823 |
| 2019/0080096 | A1 * | 3/2019 | Savry ...................... G06F 21/44 |
| 2019/0132136 | A1 * | 5/2019 | Scarlata ................. H04L 9/0891 |
| 2019/0273738 | A1 | 9/2019 | Brickell |
| 2021/0026966 | A1 * | 1/2021 | Ghetie .................. H04L 9/0643 |
| 2022/0198021 | A1 * | 6/2022 | Subramanian ...... G06F 21/6227 |

FOREIGN PATENT DOCUMENTS

| | | | | |
|---|---|---|---|---|
| EP | 3337085 A1 * | 6/2018 | ........... | G06F 21/572 |
| KR | 20070103741 A * | 10/2007 | ................ | H04L 9/32 |
| KR | 20180010482 A * | 1/2018 | .............. | H04L 67/16 |

OTHER PUBLICATIONS

Notification of Transmittal of the International Search Report and the Written Opinion of the International Searching Authority, or the Declaration, International Application No. PCT/EP2022/069378, Dec. 16, 2022, 16 pgs.

De Clercq et al., "SOFIA Software and control flow integrity architecture", 6 pps, 2016.

Ozga et al., "Krypton: CPU-enforced software and hardware entanglement", downloaded from the Internet on May 10, 2021, 10 pps.

Savry et al., "Intrinsec, an Intrinsically Secure Processor", Zürich RISC V Workshop| Dec. 6, 2019, Nano Elec., Ileti cea tech, 15 pps.

Sullivan et al., The Dover Architecture, Hardware Enforcement of Software-Defined Security Policies, Draper, 9 pps., Nov. 28, 2016, <https://web.cs.wpi.edu/~rjwalls/nesd/slides/SullivanDraperNESDFall2016Dover.pdf>.

Sullivan et al., "The Dover inherently secure processor," 2017 IEEE International Symposium on Technologies for Homeland Security (HST), Waltham, MA, 2017, pp. 1-5, doi: 10.1109/THS.2017.7943502.

Werner et al., "Sponge-Based Control-Flow Protection for IoT Devices", 2018 IEEE European Symposium on Security and Privacy (EuroS&P), 2018, 13 pps.

* cited by examiner

SECURELY EXECUTING SOFTWARE BASED ON CRYPTOGRAPHICALLY VERIFIED INSTRUCTIONS

BACKGROUND

The disclosure relates generally to computer security. The disclosure relates particularly to securely executing instructions on a computerized device.

Human activities and their security often depend on the operation of security and safety critical systems built from high-assurance security devices. For example, banks and governments rely on hardware security modules to protect cryptographic material that is used to digitally certify and encrypt data, cooling systems of nuclear plants rely on sensor outputs, and healthcare of patients in hospitals require autonomous instrumentation to control vital functions. A malicious actor having physical access to such devices can compromise security and safety critical systems and, therefore, endanger human activities, health, or life.

High-assurance security devices must comply with certain standards, such as the Federal Information Processing Standard (FIPS) Publication 140-2. Such standards certify that the devices provide sufficient guarantees against certain classes of threats. Manufacturers implement different mitigation techniques (both in software and hardware) to meet such standards. However, an adversary may bypass security protections by tampering with software controlling the device. Specifically, by modifying the device's memory content, the adversary can load arbitrary software, which may: disable security checks (thus violating control flow integrity); provide mocked values (violating data integrity); and/or read data processed by the device (violating data confidentiality).

Various mitigation mechanisms are known, which mostly focus on: enforcing software integrity during the system boot; protecting data integrity and confidentiality when loading data to the system's memory; authenticating software instructions before execution; protecting the software control flow integrity using a static analysis at the compilation level; and protecting cryptographic material, required to verify or attest to device integrity, with a tamper-responsive mechanism.

In more detail, secure boot is a design ensuring the integrity of software loaded to the memory from the moment the computer is powered on. The bootstrapping process originates inside the central processing unit (CPU) package and continues by loading more complex software, hence enabling next hardware components, etc. The secure boot design requires each software to verify cryptographic signatures of the next software before executing it. This prevents loading unauthorized software because an adversary cannot forge the digital signature. Such a design assumes that the software implementation is free of memory vulnerabilities. However, software may contain bugs that might be exploited to load arbitrary software to the memory. Even in case of formally proven software that is free of such vulnerabilities, an adversary may potentially mount hardware side-channel attacks to skip the secure boot verification process. For example, the adversary can modify the control flow integrity by flipping memory bits in the legitimate software already loaded to the memory. The program execution would therefore skip certain instructions, i.e., security checks, allowing unsigned software to be loaded.

Memory encryption is a technique protecting devices from attacks where an adversary directly modifies data residing in the random-access memory (RAM). Specifically, memory encryption protects against an adversary who controls a peripheral device with direct memory access (DMA), an adversary who can hijack the communication between the CPU and RAM, or an adversary who can steal the memory card and read it out later (cold boot attack). A memory management unit (MMU), residing inside the CPU package, uses a cryptographic key to encrypt and decrypt all data leaving and entering the CPU package. However, the memory encryption does not protect against an adversary who directly boots arbitrary software by modifying firmware, exploits legitimate software using memory corruption techniques to load custom instructions to RAM, or uses software vulnerabilities and misconfigurations to execute custom applications.

Some CPU designs propose mitigating software vulnerabilities within the CPU package. Such designs require a dedicated programmable unit for metadata processing. A dedicated function, executing in parallel to the instruction processing pipeline, uses the instruction's metadata, instruction opcode, registers, and program counter to verify that the instruction conforms to the policy. The policy is loaded during the boot process. Processor architectures have been developed according to such CPU designs, which aim at providing confidentiality, integrity, and authenticity of instructions executed by the CPU. Such architectures use metadata to store a message authentication code (MAC) of each instruction. Additionally, each instruction is encrypted with a key stored inside a CPU package register. The main drawback of these solutions is that they require loading a policy or a cryptographic key during the boot. Now, an adversary, who physically controls the device, may load an arbitrary policy or a cryptographic key allowing the adversary to run arbitrary software. Also, the above designs do not protect against downgrading software to vulnerable versions, i.e., rollback attacks.

The FIPS 140-2 level 3 is a standard used by high-assurance security devices exposed to an adversary physically controlling them. This standard assumes that, with low probability, an adversary might tamper with the device integrity, for example when the device and tamper-response circuitry are powered off. Consequently, an adversary might try to bypass software-level protections after gaining access to the device memory, i.e., read-only memory (ROM), RAM, or CPU caches. The FIPS 140-2 level 4 currently provides the highest level of security. It requires active detection of all physical attacks and removal of critical security parameters stored inside the device on attack detection. However, to implement such mechanisms, the devices require a sophisticated tamper-responsive enclosure which needs a constant power supply. Therefore, new solutions are needed for securely executing instructions on a computerized device.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable securely executing instructions on a computerized device.

Aspects of the invention disclose methods, systems and computer readable media associated with securely executing instructions of software on a computerized device by accessing a software of a computerized device, wherein the software includes a plurality of instructions and respective reference message authentication codes (MACs), generating a cryptographic key based at least in part on a key derivation function, wherein arguments of the key derivation function are based at least in part on a unique identifier of the computerized device and a value extended from a measurement of a content of the software of an extension mechanism of a platform configuration register of the computerized device, verifying an instruction of the plurality of instructions of the software based at least in part on the cryptographic key and a reference MAC of the respective reference MACs, and in response to verifying the instruction of the plurality of instructions of the software, executing the instruction. As a result, the disclosed methods derive a deterministic encryption key specific to the CPU chip and software and provides rollback protection and stronger security guarantees against an adversary with physical access to the device.

Aspects of the invention disclose methods for interrupting execution of the instruction of the software in response to a failure to verify the instruction of the plurality of instructions of the software, which enforces authenticity of code and data as well as in the face of physical adversary.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., securely executing instructions of software on a computerized device, mitigating software vulnerabilities within the CPU package, protecting devices from attacks where an adversary directly modifies data residing in the random-access memory (RAM), etc.). These solutions are not abstract and cannot be performed as a set of mental acts by a human due to the processing capabilities needed to facilitate secure execution of instructions on a computerized device, for example. Further, some of the processes performed may be performed by a specialized computer for carrying out defined tasks related to generating a cryptographic key based at least in part on a key derivation function. For example, a specialized computer can be employed to carry out tasks related to the encryption algorithm and the decryption algorithm or the like.

Implementation of embodiments of the invention may take a variety of forms, and exemplary implementation details are discussed subsequently with reference to the Figures.

In reference to FIGS. 1, 2, 4, 6, and 7, various embodiments of the invention are now described in detail, which concerns a computerized method of securely executing software on a computerized device. Note, the present method and its variants are collectively referred to as the "present methods". All references Sn refer to methods steps shown in FIGS. 3-6, while numeral references pertain to physical parts or components of a computerized device shown in FIGS. 1 and 2.

Generally, the present methods rely on message authentication codes (MACs) to cryptographically verify instructions of software, prior to executing the instructions. The verifications are performed based on the instructions and the MACs, using a cryptographic key that is derived at runtime, according to a unique identifier (UID) of the computerized device and a value extended from a measurement of a content of the software according to an extension mechanism of a platform configuration register (PCR) of the computerized device. Thus, the present methods leverage both a PCR extension mechanism and UID of the computerized device to establish a chain of trust up to the runtime verification of the instructions.

Figure 1:
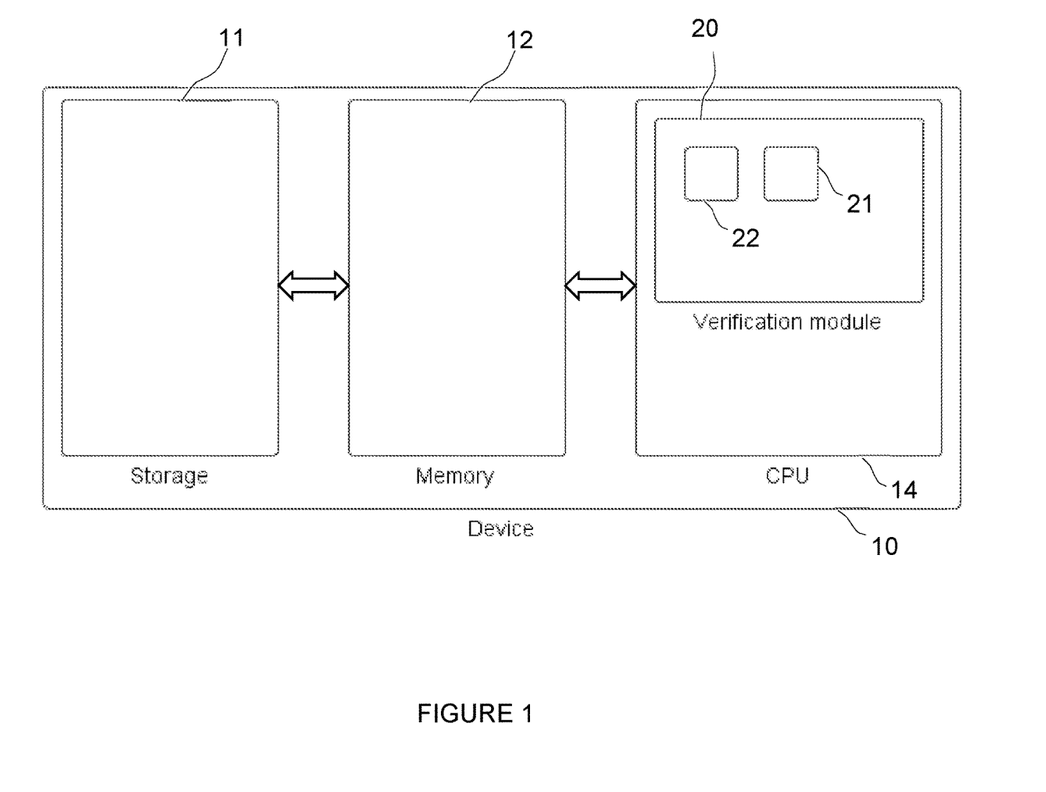
FIG. 1 provides a schematic illustration of a computerized device, according to an embodiment of the invention.

FIG. 1 depicts a block diagram of components of a computerized device (e.g., device 10), in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

FIG. 1 includes storage 11, memory 12, computer processing unit (CPU) 14, hardware module 20, circuit 21, and memory circuit 22. Storage 11 includes a component of a computerized device that allows storage and access to data on a long-term basis. For example, storage 11 can includes forms such as a solid-state drive or a hard drive. Memory 12 is a computer readable storage media. In this embodiment, memory 12 includes random access memory (RAM). In general, memory 12 can include any suitable volatile or non-volatile computer readable storage media. CPU 14 is the electronic circuitry that executes instructions comprising a computer program. For example, the CPU 14 performs basic arithmetic, logic, controlling, and input/output (I/O) operations specified by the instructions in the program. Hardware module 20 is a physical computing device that safeguards and manages digital keys, performs encryption and decryption functions for digital signatures, strong authentication and other cryptographic functions. Circuit 21 is a dedicated circuit to measure a property of the CPU 14 and produce a UID. Memory circuit 22 is a dedicated fixed sized memory. For example, memory circuit 22 is one of a small set of data holding places that are part of the CPU 14 (i.e., a register).

Figure 2:
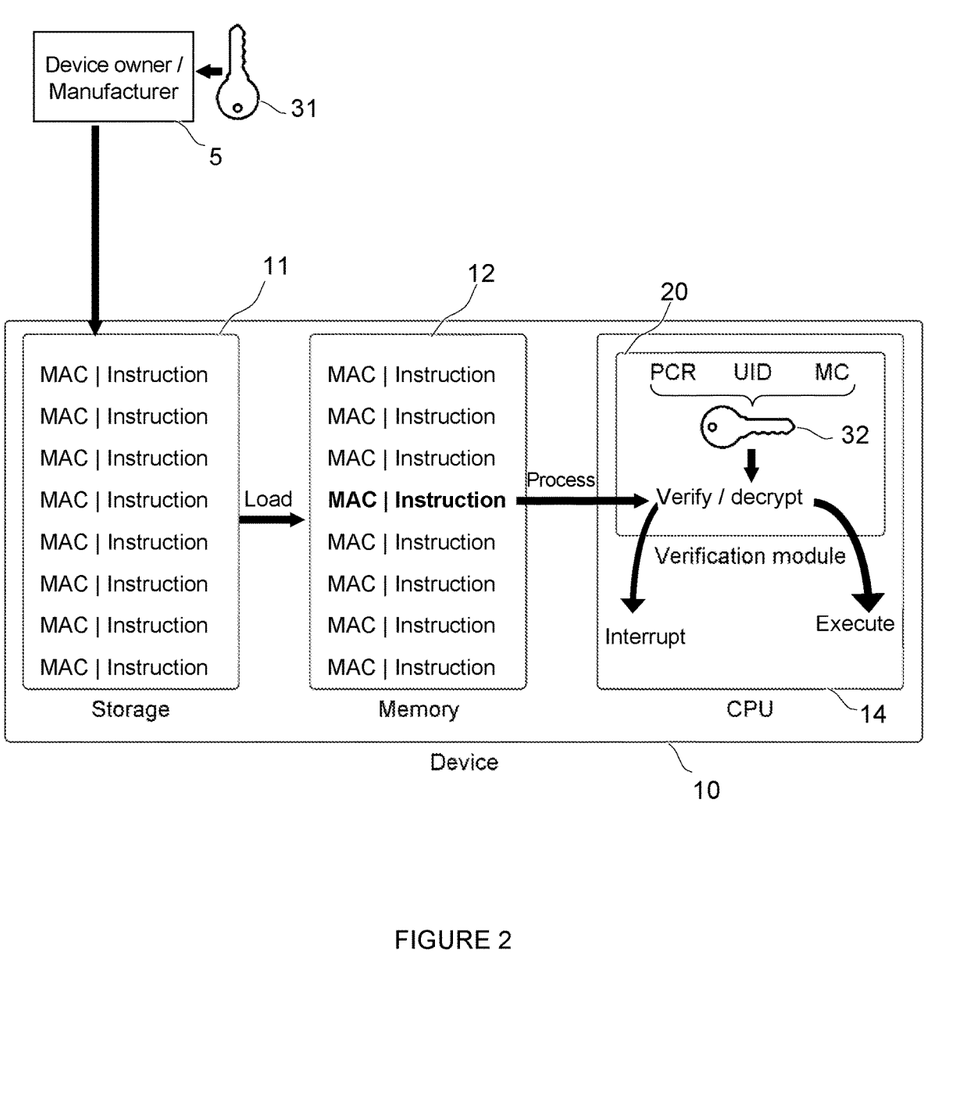
FIG. 2 provides a diagram illustrating operations performed at the computerized device of FIG. 1, according to an embodiment of the invention.

FIG. 2 is a diagram schematically illustrating operations performed at the device 10 of FIG. 1. FIG. 2 includes legitimate entity 5, key 31, and key 32. Legitimate entity 5 is an authorized device that requests access to and uses resources of a computer system or network (e.g., a manufacturer or owner of software). Key 31 is a cryptographic key that is derived utilizing the legitimate entity 5. Key 32 is a cryptographic key that is derived utilizing the device 10.

Figure 4:
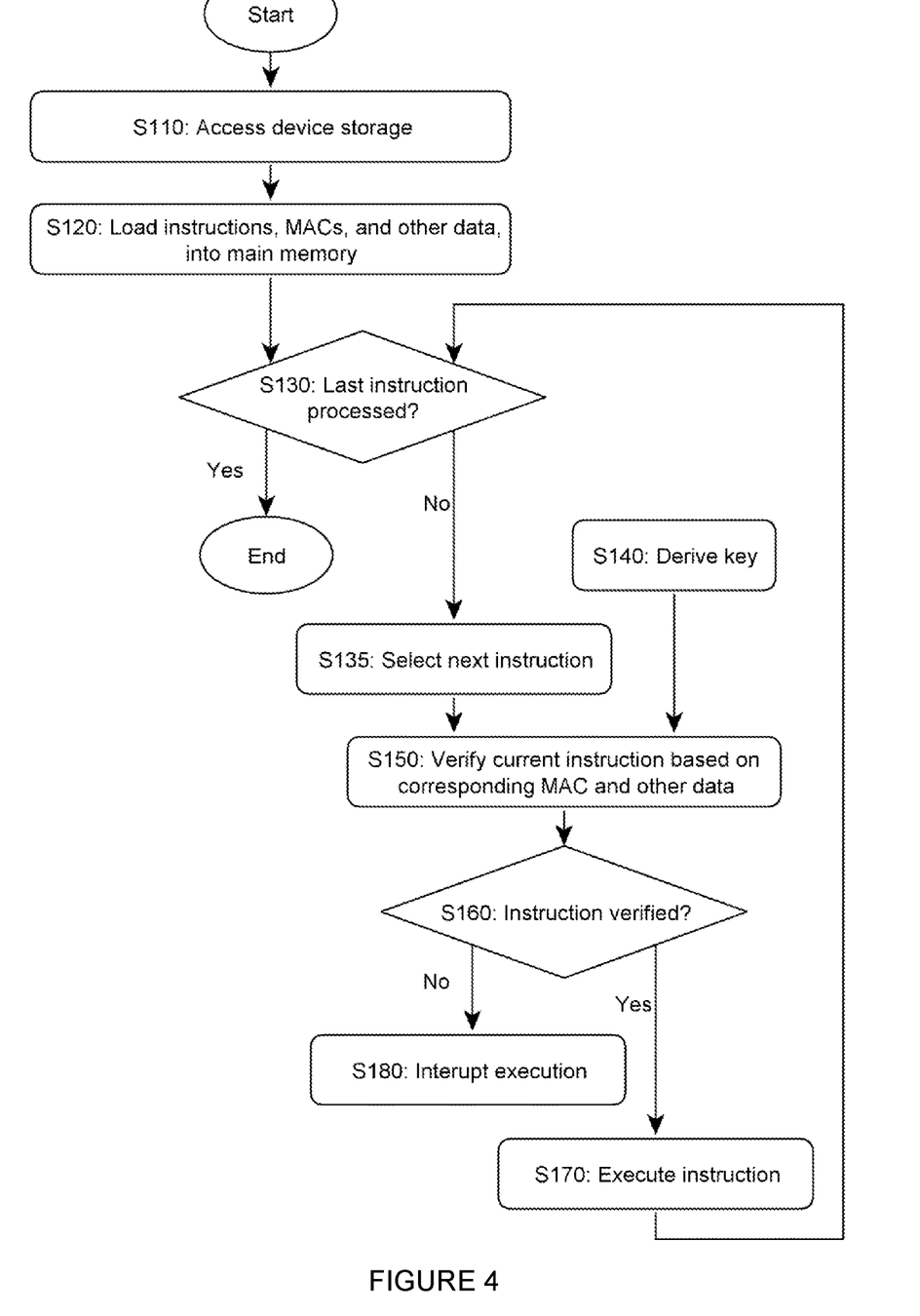
FIG. 4 provides a flowchart depicting an operational sequence, according to an embodiment of the invention.

Referring now to FIG. 4, embodiments of the present disclosure will be described with respect to FIGS. 1 and 2. After program start, at step S110, the method of securely executing software on a computerized device accesses device storage. In one embodiment, the method first comprises accessing a software that is stored in storage 11 of the device 10. The software includes instructions and message authentication codes (MACs), also known as message integrity codes. The MACs correspond to the instructions and are associated with these instructions in the software. Such MACs are meant to be used as references, in order to verify the instructions; the MACs are accordingly referred to as "reference MACs" in this description.

At step S120, the method loads the accessed instructions and MACs into a memory 12 of the device 10, with an objective to verify and execute the instructions. To that aim, the instructions and corresponding MACs (as loaded in the main memory) are loaded to processor registers of CPU 14 of the device 10.

At step S170, the method, subject to verifications thereof (steps S140-S160) the instructions, subsequently executes the instructions. For example, the instructions are verified prior to the CPU 14 executing them. In this example hardware module 20 verifies the instructions by performing cryptographic verification operations, as described below.

In various embodiments of the present disclosure the verifications involve the instructions and the reference MACs and are performed with respect to a cryptographic key 32. At step S140, the method utilizes a key derivation function (KDF) to generate a key at runtime. In one embodiment, the method utilizes the hardware module 20 to generate the cryptographic key 32. In this embodiment, the arguments of the KDF can be based on a unique identifier (UID) of the device 10, e.g., of the circuit 21, and/or a value obtained from a platform configuration register (PCR) (e.g., memory circuit 22) of the device 10. Additionally, the method extends this value from a measurement of a content of the software, according to an extension mechanism of the PCR. This extended value is also referred to as the "PCR value" in this description.

In various embodiments of the present disclosure the KDF uses multiple arguments. However, such a function may be computed in various ways. In particular, the method can combine (e.g., concatenate) arguments to form a single value that is used as input by the KDF, as in embodiments discussed later.

The present approach relies on a shared secret between the device owner (e.g., the manufacturer, any legitimate entity, etc.) and the verification mechanism implemented at the device 10. More precisely, the device owner and the device 10 share a recipe (e.g., encryption recipe) to suitably derive the cryptographic key. With respect to the recipe, the method enables the device 10 to re-derive the key 32, which is used to check the integrity, authenticity of the instructions, and decrypt such instructions.

In various embodiments of the present disclosure the instructions stored in the software are programming instructions, i.e., program codes. For example, the instructions may be encrypted, as in embodiments described below. In principle, such instructions could be high-level instructions, i.e., forming a source code written in a high-level language, which are interpreted in real time with respect to an interpreter layer, i.e., a program running while executing the method. However, machine code instructions that are directly interpretable by the CPU 14, such as instruction set architecture (ISA)-specific codes, may provide a greater benefit with respect to processing resources. In that instance, the method operates on compiled software, which nevertheless includes MACs in association with the binary instructions.

The present MACs should be understood in a broad sense. For example, the MACs can be keyed hashes obtained from the instructions, using the key 32. Additionally, the MACs can be obtained using a cryptographic hash function, together with the key 32, similar to hash-based message authentication codes (HMACs). In more sophisticated approaches, the MACs may be computed so as to ensure the integrity of the instructions as a whole, including their order. To that aim, the values of the MACs may be interdependent. For example, the control flow integrity enforcement can be achieved by using the previous instruction's MAC to calculate the next instruction's MAC, as in embodiments discussed below. Such an approach can be used to guarantee the order in which the instructions execute.

In an embodiment, the cryptographic key 32 can notably be used for the device 10 to explicitly compute verification MACs, which the method subsequently compares with the reference MACs. In alternative embodiments, the computation of the verification MACs and the comparison with the reference MACs may only be implicit, this depending on the verification mechanism employed. For instance, the instructions can be encrypted, and the software may optionally contain additional data, notably where authenticated encryption with associated data (AEAD) algorithms are used, as in embodiments discussed below. When using an AEAD scheme, the decryption of the instructions makes use of the instructions, the reference MACs, and the additional data. In that case, the authenticity and integrity of the instructions is ensured by the AEAD decryption mechanism.

In an embodiment, the method, in all cases, utilizes the reference MACs to check the integrity and authenticity of the instructions (and possibly decrypt them) at runtime. The PCR value guarantees the integrity of the software upon booting, as per the extension mechanism.

In an embodiment, the UID that is used together with the PCR value to derive the key 32 is preferably a unique identifier of the CPU 14 of the device 10. In this embodiment, the UID more preferably reflects a physical unclonable function (PUF) of the CPU 14. Thus, relying on the UID enables the method to entangle the software integrity (via the PCR value) with the hardware, to derive the key. In an embodiment, the device owner, having access to the UID so as to initially obtain the MACs and store them in the software together with the instructions, can use the same KDF as the device 10 to derive a first key 31 prior to storing the software in the device 10, i.e., at build-time. In contrast, the second key 32 is derived at runtime by the device 10. For example, the two keys 31, 32 are not the same inasmuch as they are generated at two different times and by two different devices 5 and 10 respectively. However, the two keys must have an identical value for the instructions to execute, else the software execution will be interrupted, as per the proposed method.

All this is now described in detail, in reference to particular embodiments of the disclosure. In various embodiments of the present disclosure, the method performs the cryptographic verification operations of S140-S160 by explicitly computing verification MACs at the device 10 to verify the instructions.

In an embodiment, the method utilizes hardware module 20 to verify MACs. For example, the method re-computes the verification MACs at the device 10 (at runtime), which respectively correspond to the instructions, and uses the verifications MACs to perform the verifications. In this example, the method can perform the verification operations utilizing the cryptographic key 32. For example, the method computes both the reference MACs and the verification MACs as HMACs. In this example, the method compares the verification MACs with the reference MACs, to perform the verifications. To that aim, the method can load the reference MACs into the CPU registers (e.g., memory circuit 22), like the instructions. For example, each instruction and corresponding reference MAC may be loaded to the main memory (e.g., memory 12) and, then, from the main memory to the CPU registers, for the method to perform the verification in the CPU pipeline.

Figure 7:
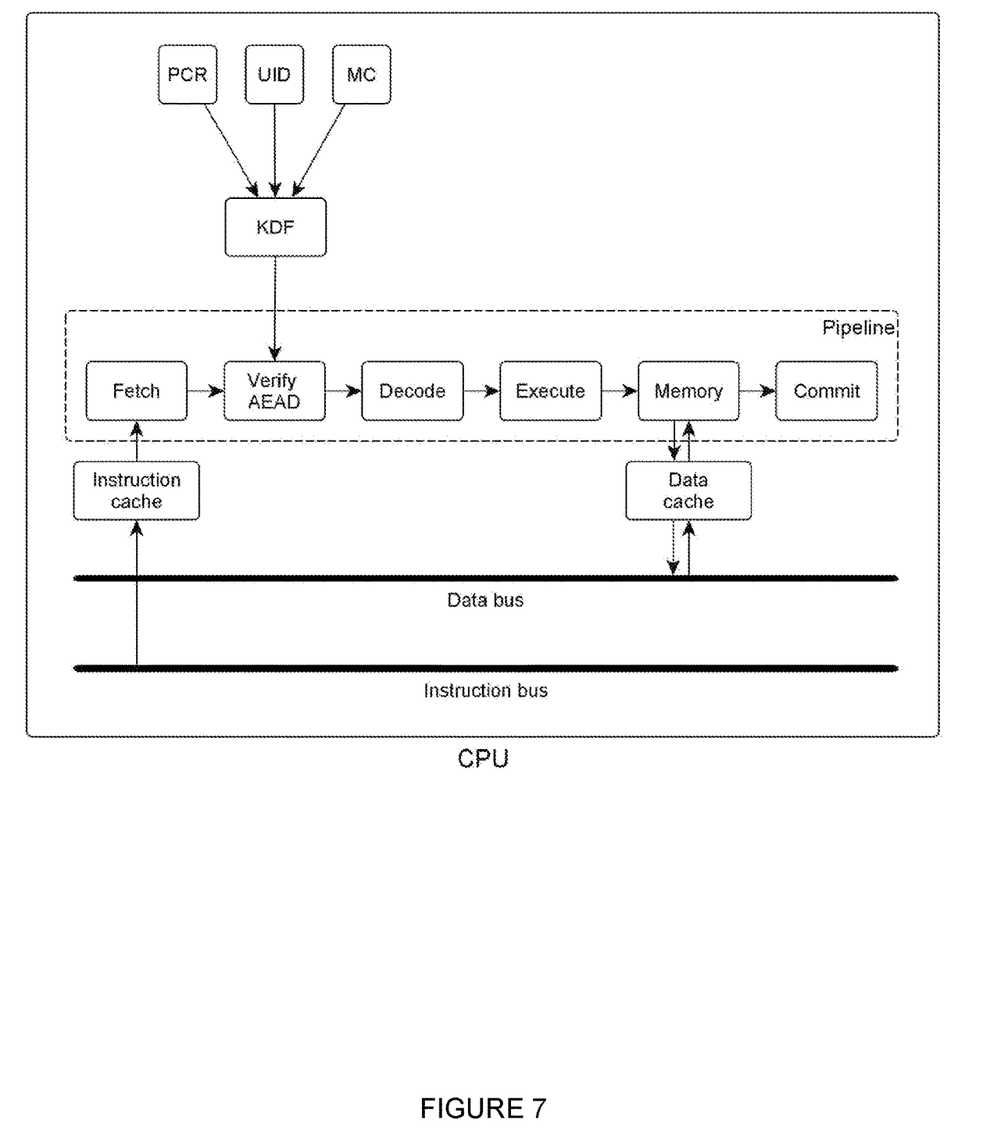
FIG. 7 provides a schematic illustration of an operation pipeline, according to an embodiment of the invention.

In an alternative example, the method verifies the instructions all at the same time, i.e., as a whole, prior to executing them. However, it is advantageous to successively verify the instructions and execute them subject to their verifications with respect to processing resources. At step S160, the method verifies instructions. In an embodiment, the method utilizes hardware module 20 to determine whether to execute an instruction of memory 12. For example, the method processes the instructions consecutively (one after the other), whereby each instruction is first verified and then executed unless verification fails. In one scenario, if the method determines that a value of a key corresponding to an instruction does not match values of a key of hardware module 20, i.e., the verifications fail (step S160: No), then the method interrupts the execution of the instruction of the software, i.e., S180. Note, the method interrupts software execution as soon as any of the verifications fail. Successively verifying the instructions makes it possible for the CPU to directly verify each instruction and then execute it on the fly, without having to interact further with the main memory or a memory cache, e.g., without having to store the verified instructions (outside of the CPU registers) and recall them for execution. In other words, each of the instructions can be successively processed in a CPU pipeline, as illustrated in FIG. 7.

Figure 3:
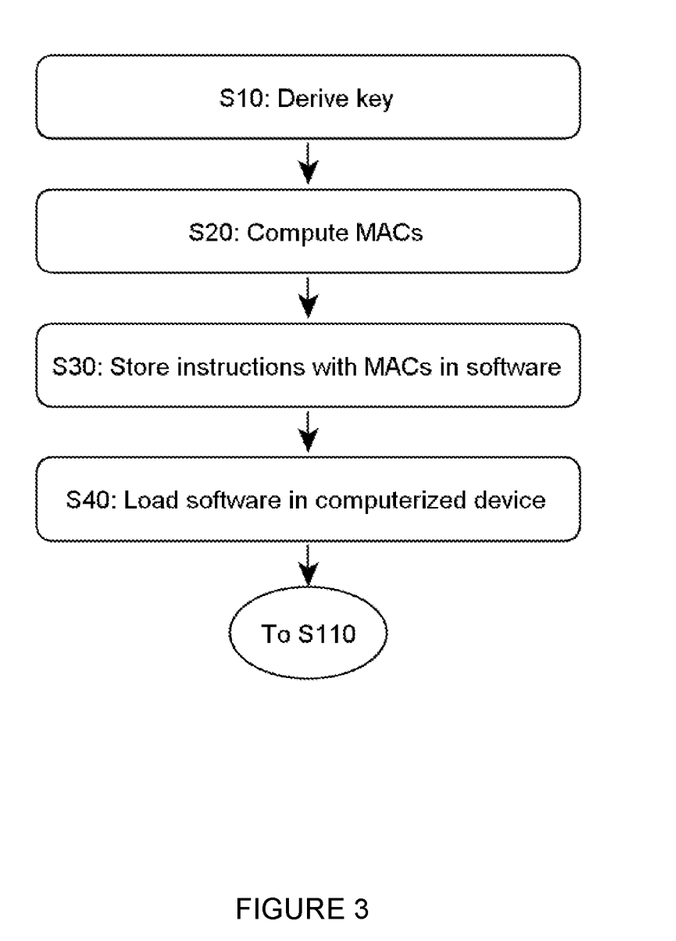
FIG. 3 provides a flowchart depicting an operational sequence of preliminary steps for storing instructions and respective message authentication codes, according to an embodiment of the invention.

The present methods may include a series of preliminary steps, during which the reference MACs are computed, as well as any data necessary for the subsequent verification steps. Referring to FIG. 3, at step S10, the method derives a key. In an embodiment, the method utilizes the legitimate entity 5 to derive the key 31. For example, legitimate entity 5 using the same KDF as later used by the device 10 to generate an initial cryptographic key. At step S20, the method computes MACs. In an embodiment, the method utilizes the legitimate entity 5 to compute reference MACs. For example, the legitimate entity 5 (e.g., the device owner or the manufacturer) may compute the reference MACs based on an initial cryptographic key, which is derived in step S10. At step S30, the method stores instructions with the MACs in software. In an embodiment, the method utilizes the legitimate entity 5 to store the computed reference MACs with instructions of software in the storage 11 of the device 10. For example, the reference MACs are stored together with the instructions in software prior to storing the instructions and the reference MACs on the computerized device. In this example, each reference MAC corresponds with an instruction of the software prior to loading the software into memory of the computerized device. At step S40, the method loads software in the computerized device. In an embodiment, the method stores the computed reference MACs with instructions of the software in the memory 12 of the device 10. In addition to the computed reference MACs and instructions, the software may possibly include nonces and additional data, to decrypt the instructions and perform the verification operations, should the instructions be encrypted, e.g., using an AEAD scheme.

Figure 6:
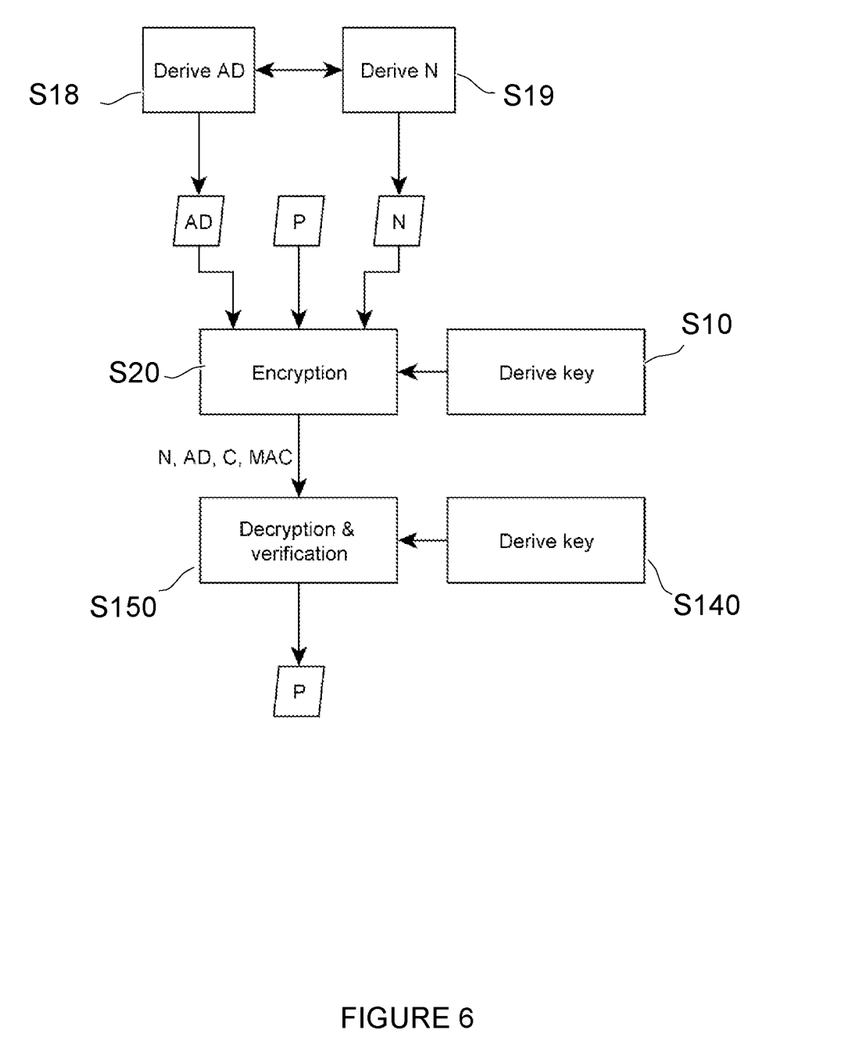
FIG. 6 provides a diagram illustrating authenticated encryption with associated data scheme, according to an embodiment of the invention.

In various embodiments of the present disclosure the reference MACs can capture an interdependency scheme, so as to additionally ensure the integrity of the order in which instructions execute, as assumed in the diagram of FIG. 6. That is, the method can initially compute the reference MACs by performing cryptographic encoding operations based on the instructions and the KDF, according to this interdependency scheme.

For example, this interdependency scheme can be designed so as for each of the reference MACs, except for the first MAC, to depend on the previous reference MAC (or information derived therefrom). Enabling the method to protect the control flow integrity by using the previous instruction's MAC to calculate the next instruction's MAC. The computation of the very first MAC may use any suitable initial value. In that case, the software further includes interdependency data, which reflect this interdependency scheme. At runtime, the method can load the interdependency data to the memory 12 of the device 10 (in addition to the instructions and reference MACs), for the verifications performed at steps S140-S160 to correctly apply the interdependency scheme.

In various embodiments of the present disclosure more sophisticated interdependency schemes can be developed. For example, the method can utilize a hierarchical scheme, in which each MAC, except for the first n MACs, is computed with respect to information contained in or derived from the n previous MACs. The cryptographic verification operations can be consistently performed. For example, the method can compute verification MACs based on previously obtained MACs, at runtime, at least where explicit computations of the MACs are required. Also, explicitly computing verification MACs can be useful when the instructions stored in the software are not encrypted. However, this is not always necessary, in particular when encryption/decryption operations are further involved to encrypt and decrypt the instructions. In that case, interdependencies can suitably be captured as rules encoded by way of additional data AD and nonces N, as assumed in the diagram of FIG. 6. Note, the method can compute the additional data AD consistently with the nonces N during preliminary steps S18-S19, i.e., prior to computing step S20 the reference MACs, see also FIG. 3.

In embodiments, the instructions are encrypted according to an encryption algorithm that uses the KDF as defined above. Note, in FIG. 6, the references "P" and "C" respectively denotes non-encrypted and encrypted instructions (P and C stand for "plain" and "cypher", respectively). This encryption algorithm may cause performance of cryptographic encoding operations as described above. Then, at runtime, the instructions can be verified by merely decrypting the encrypted instructions, as illustrated in FIG. 6. To that aim, the decryption algorithm used must be devised consistently with the encryption algorithm used to encrypt the instructions. The decryption is performed with respect to the cryptographic key 32 and uses the reference MACs and instructions as input.

Various encryption algorithms can be utilized, such as the Encrypt-and-MAC or MAC-then-Encrypt algorithms. However, in preferred embodiments, the encryption algorithm and the decryption algorithm rely on an AEAD scheme, as now described in detail in reference to FIG. 6. The AEAD algorithm is provides more security than the Encrypt-and-MAC or MAC-then-Encrypt algorithms in the present context.

As illustrated in FIG. 6, for each plain instruction P, the AEAD encryption algorithm initially produces at S20 (e.g., computes MACs) a corresponding encrypted instruction C and a corresponding reference MAC. The AEAD encryption algorithm utilizes additional data AD and nonces N to suitably encrypt the instructions and produce the MACs. The additional data AD and the nonces N are passed from the encryption side to the decryption side, as seen in FIG. 6. In this example embodiment, the method embeds the data in the software. As a result, the software may include additional data AD and nonces N, in addition to the encrypted instructions and the reference MACs.

In more detail, the method generates the additional data AD and nonces N consistently via steps S18-S19 to compute (e.g., step S20) the MACs from the plain instructions P, using the key 31 derived at step S10 at build-time, as illustrated in FIG. 6. The entity that encrypts the software is typically the entity that also selects the nonces and generates the additional data AD. The nonces can be selected arbitrarily. However, a nonce should be unique for each instruction and for each cryptographic key. For a given key, the nonces may for example be natural numbers increasing from 1 to the number of instructions.

In an embodiment, the method obtains the reference MACs and encrypted instructions C from the output of the encryption algorithm (e.g., S20 FIG. 6). The method passes the additional data AD, the nonces N, and the encrypted instructions C to the decryption algorithm. As per the AEAD scheme, the decryption algorithm can correctly decrypt only if it uses the same nonces as used during encryption. Therefore, in the decryption process the method utilizes the methodology of step S150 and the key 32 as derived in step S140 at runtime (see FIG. 4), as well as the additional data AD and the nonces N to decrypt the instructions C. The AEAD decryption process allows the integrity and authenticity of the instructions to be verified while decrypting the instructions C.

In various embodiments of the present disclosure the instructions C are preferably decrypted one by one, for improved security. To that aim, the method loads the additional data AD and the nonces into the memory 12 (i.e., just like the instructions C and the reference MACs). Then, the method loads each instruction into the processor registers, together with the corresponding nonce and additional data required for the decryption algorithm to suitably decrypt and verify the encrypted instructions C, e.g., as part of CPU pipeline such as depicted in FIG. 7. In an alternative embodiment, the method can first decrypt the instructions C all at a same time. In that case, the decrypted instructions P would typically have to be stored in plain text in the CPU cache, which implies additional data exchanges between the CPU core and the cache memory, as well as larger vector attack. Indeed, such approaches are more prone to attacks targeting data stored in the cache. So, in an embodiment, the method decrypts instructions one after the other, so as to locally perform all required operations by the CPU core, without having to store any decrypted instruction in the cache.

As discussed earlier, the cryptographic keys 31, 32 are derived from the PCR value and the UID, whether at build-time or at runtime. Still, additional data may be used to derive the keys 31, 32, such as a monotonic counter value, for reasons that will become apparent later. In all cases, a unique key can be made available for each computerized device 10 and each software running on device 10.

In an embodiment, the method properly selects the nonces to ensure control flow integrity. In the AEAD approach, a current instruction's nonce can be obtained using the previous instruction's MAC (e.g., value). In operation, the previous instruction's MAC is temporarily stored inside the CPU (or in cache). The CPU uses this value to calculate the nonce for the current instruction. That is, an instruction that the CPU will execute next must first be decrypted and verified. Once the CPU has calculated the nonce relevant to the current instruction, it attempts to decrypt the current instruction. The nonces can be computed in several ways. For example, they can be calculated using addresses of instructions, which results in a unique nonce per instruction. Another example would be to draw nonces and store them in associated data next to encrypted instructions.

In various embodiments of the present disclosure the arguments of the KDF can be based on both the UID of the device 10 and the PCR value, which means that the arguments must somehow be obtained from the UID and the PCR value. For example, in embodiments, such arguments include the PCR value and an output of an intermediate function $f(\cdot)$ of the UID, i.e., $f(UID)$. Next, the two values (i.e., the PCR value and the output) may be concatenated to form a single argument, which is taken as input by the KDF. In this scenario, the KDF can be regarded as a function having a single argument. For example, the cryptographic key 32 may for example be obtained as:

$$\text{cryptographic key} = KDF(f(UID) \| PCR \text{ value}).$$

The intermediate function may be any suitable function, such as a hash function. It may also be the identity function, in which case:

$$\text{cryptographic key} = KDF(UID \| PCR \text{ value}).$$

The intermediate function may also be the KDF itself, when regarded as a single-argument function. For example, the key 32 may for example be obtained as:

$$\text{cryptographic key} = KDF(KDF(UID) \| PCR \text{ value}).$$

In additional embodiments of the present disclosure the arguments of the KDF further include a current value of a monotonic counter MC, as assumed in FIGS. 2 and 7. The function of the monotonic counter MC is to capture a current version of the software stored in the device 10. That is, the monotonic counter MC is set (e.g., by the CPU, or a dedicated circuit thereof) to monotonically increase with updates to the software. As a result, any update to the software causes an increase of this counter, which impacts the derived keys 31, 32, whether at build-time or at runtime. As a result, enabling the legitimate entity 5 to track and verify the current software version executing on the device 10, as discussed later in detail.

For example, if the method uses the monotonic counter value in addition to the UID and the PCR value, then the arguments of the KDF may include the PCR value, the output of the intermediate function $f(\cdot)$ of the UID, and the current value of the monotonic counter MC. In this example, the key 32 may be obtained as follows:

cryptographic key=KDF(ƒ(UID)‖PCR value‖MC), or cryptographic key=KDF(ƒ(UID‖MC)‖PCR value).

In another example, the method computes the key 32 as:

cryptographic key=KDF(KDF(UID‖MC)‖PCR value).

Figure 5:
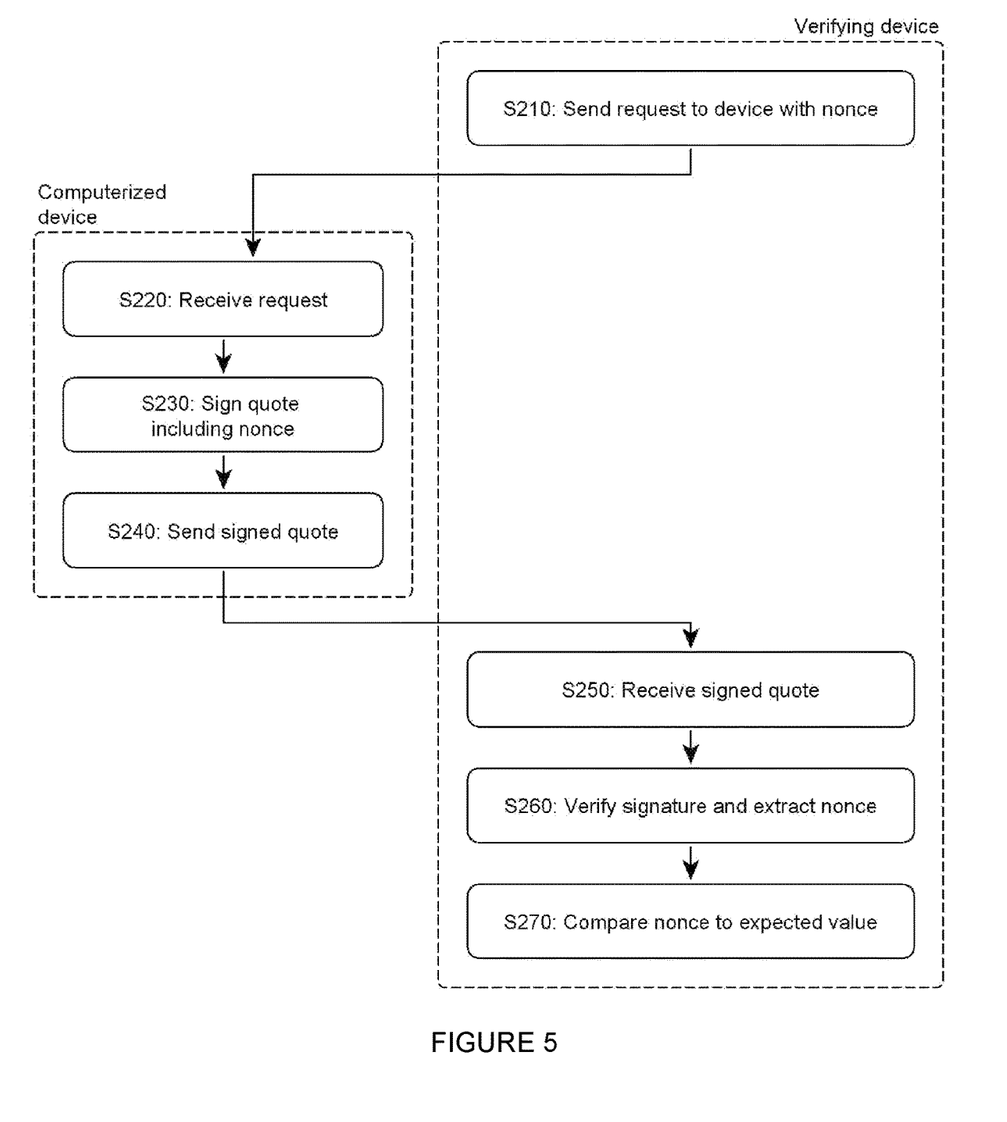
FIG. 5 provides a flowchart depicting an operational sequence of steps a verification method, according to an embodiment of the invention.

FIG. 5 depicts a flowchart illustrating a legitimate entity verifying the current version of the software executing on the device 10 utilizing the current counter value MC. In various embodiments of the present disclosure such a verification relies on the PCR value, the monotonic counter value MC, and a nonce. At step S210, the method sends a request to a computerized device with a nonce. In an embodiment, the method utilizes legitimate entity 5 to transmit a request that includes a nonce to the device 10. For example, a nonce is sent S210 by the legitimate entity 5 to the device 10. At step S220, the computerized device receives the request of the verifying device. In an embodiment, the method receives confirmation that the request the legitimate entity 5 transmits is received at the device 10. At step S230, the computerized device signs a quote including the nonce. In an embodiment, the device 10 signs a quote of the request of the legitimate entity 5. For example, the computerized device (e.g., device 10) digitally signs a quote that includes the nonce, using the key 32, e.g., as derived at step S140 of FIG. 4. At step S240, the computerized device transmits the signed quote. In an embodiment, the device 10 transmits the signed quote to the legitimate entity 5. For example, the computerized device (e.g., device 10) transmits the digitally signed quote to a verifying device (e.g., legitimate entity 5). At step S250, the method receives the signed quote. In an embodiment, the legitimate entity 5 receives the signed quote of the device 10. For example, a verifying device (e.g., legitimate entity 5) receives the digitally signed quote of the computerized device (e.g., device 10).

At step S260, the method verifies a signature and extracts a nonce. In an embodiment, the method utilizes the legitimate entity 5 to verify the signed quote of the device 10. For example, the method verifies a signature of the quote provided by the computerized device and extracts the nonce of the quote. At step S270, the method compares the nonce to an expected value. In an embodiment, the method compares a nonce of the signed quote of the device 10 to a value of the legitimate entity 5. For example, the method compares the extracted nonce of the quote to an expect value, that is, the nonce value as initially used at step S210. Only a correct key 32 (i.e., derived based on correct parameters, see FIG. 2) can attest to the correct version of the software running on the device 10. This nonce is used to prevent replay attacks; it should be distinguished from the nonce values used in the AEAD scheme described earlier. FIG. 5 is described in detail below. In various embodiments of the present disclosure, the quote may be encrypted using key 32 (instead of being signed) at step S230 and later decrypted using key 31 (instead of being verified) at step S260. Encrypting/decrypting the quote may be used if confidentiality is a concern.

In various embodiments of the present disclosure, the method can obtain the UID, which is an identifier, from a physical unclonable function (PUF) of the device 10. Additionally, the PUF can be a physical unclonable function of the CPU 14 of the device 10, as depicted in FIG. 1. In this instant, the method can obtain the UID from the circuit 21 of the CPU 14 of the device 10, prior to generating the cryptographic key 32. For example, the CPU 14 may include the circuit 21 configured to measure a property of the device (or, in fact the CPU) and accordingly produce a digital fingerprint (e.g., the UID). The method utilizes the obtained UID to derive the key 32. Additionally, a person having ordinary skill in the art recognizes the circuit 21 is designed to prevent anyone having physical access to the circuit 21 in order to learn the UID (i.e., via a debug port). Thus, the output of the circuit 21 is accessible only by the KDF circuit.

For example, and as depicted in FIG. 1, the circuit 21 can form part of the hardware module 20, which may be designed to perform all sensitive operations, including the verification steps S130-S180 in FIG. 4. Various examples of circuits are known in the art, especially in the field of hardware security modules (HSMs), which allows a digital fingerprint to be derived from a physical property of a device.

The CPU 14 of the device 10 may further have additional specificities. For example, the CPU 14 can include the memory circuit 22, which can be a dedicated and a fixed-size. Memory circuit 22 may form part of the hardware module 20, as depicted in FIG. 1. In an example, the memory circuit 22 can have a fixed-size and is utilized to implement the platform configuration register. Furthermore, the present methods can further include, upon booting the device 10, measuring the content of the software and extending a value according to the extension mechanism discussed earlier, to obtain the PCR value.

Referring now to FIGS. 1, 2, and 7 various embodiments of the present disclosure, which concerns the device 10, will be described in detail. The main features of the device 10 have already been described, be it implicitly, in reference to the present methods. Accordingly, such features are briefly described in the following. Generally, the device 10 securely executes software based on MACs. The device 10 can include the storage 11, in which a software is stored by virtue of steps described earlier in reference to FIG. 3, i.e., the software includes given instructions and respective reference MACs. The device 10 further includes a processing means, e.g., the CPU 14, which may include a platform configuration register, for performing operations as described earlier in reference to FIG. 4. In addition, the device 10 includes the memory 12, meant to act as the main memory of the device 10, in operation.

In an embodiment, the device 10 is performs steps in accordance with the present methods, i.e., execute the instructions subject to verifications thereof. In this embodiment, the instructions and the reference MACs are typically loaded to the memory 12 of the device 10, prior to performing the verifications. As explained earlier, the verifications performed involve the instructions and the reference MACs of memory 12, as well as a cryptographic key 32 that is generated at runtime. In the embodiment, the device 10 generates the key 32 according to a KDF, the arguments of which are based on the UID of the device 10 and the PCR value. For example, the device 10 obtains the PCR value from a measurement of the content of the software according to an extension mechanism enabled by the platform configuration register (e.g., the memory circuit 22) of the CPU 14.

In an embodiment, the device 10 sets a monotonic counter MC, for the monotonic counter to monotonically increase with updates to the software, in operation. In this embodiment, the arguments of the KDF can include a current value of the monotonic counter. As discussed above, the UID is correlated to a PUF of the device 10, or particularly a PUF of the CPU 14. In the embodiment, the CPU 14 of the device 10 can include a dedicated circuit 21 that outputs the UID, in operation. Additionally, the CPU 14 can include a dedicated and fixed-size memory circuit 22 implementing the PCR, which provides the PCR value utilized for deriving the key 32, in operation. For example, the PCR, the monotonic counter MC, and the PUF, can be regarded as being implemented as part of a physical layer, while the respectively derived values (i.e., the PCR value, the counter value, and the UID) can be regarded as operating in the execution layer, on top of this physical layer.

In an embodiment, as depicted in FIG. 1, the CPU 14 can include a dedicated hardware module 20, which performs the sensitive operations of steps S130-S180 of FIG. 4. Also, the hardware module 20 can include the circuits 21, 22.

In another embodiment, the present methods can be embodied as a computer program product. The computer program product comprises a computer readable storage medium having program instructions embodied therewith. Such program instructions can notably be loaded to the CPU 14 of the device 10 as described above. These program instructions are executable by the CPU 14 to cause the device 10 to implement steps according to the present method, e.g., load given instructions and reference MACs to a main memory (e.g., the memory 12) of the device 10, execute the given instructions subject to verifications thereof, whereby the instructions are verified, prior to executing them, by performing cryptographic verification operations as described earlier. Additional considerations concerning this computer program product are provided below.

The above embodiments have been succinctly described in reference to the accompanying drawings and may accommodate a number of variants. Several combinations of the above features are contemplated.

The following describes example embodiments, which rely on a CPU extension to enforce that a high-assurance security device executes authorized software only. Such embodiments assume a strong threat model. For example, an adversary having physical access to the device may tamper with the memory content. Also, the adversary may exploit memory corruption vulnerabilities in the software running on the device. To mitigate these threats, various embodiments of the present disclosure propose solutions that operate on instruction-level granularity to ensure that the fetched instructions are authorized to run on a given CPU, are part of the loaded software, and match the software's control flow integrity.

In an embodiment of the present disclosure, software and hardware are entangled. For example, the CPU includes a CPU core, and the CPU can access a unique device number (UID), implement a key derivation function, and run a verification module. The UID is unique for each CPU, which is typically a number known only to the hardware owner. The key derivation function is a cryptographic algorithm that generates a cryptographic key 32 from the UID, the PCR value as discussed above, and/or other software-specific data.

In this example, the hardware module 20 is a part of the CPU core and operates between the "fetch" and "execute" stages inside the CPU pipeline shown in FIG. 7. The hardware module 20 module uses the cryptographic key 32 to decode/verify each instruction before execution.

In this example, the binary can be modified by the hardware owner. Each software's instruction is extended to include additional data allowing the hardware module 20 to verify the instruction.

In an embodiment, the CPU checks the authenticity and integrity of the instructions, yet without enforcing the confidentiality of the instructions. In the embodiment, a reference MAC is initially calculated for each instruction using the cryptographic key 31, see FIG. 3. In the binary, each instruction occupies more space to include the reference MAC, in addition to the original instruction. Confidentiality can be added by initially encrypting each instruction using an AEAD cryptographic scheme. In this scenario, software integrity is calculated over part of associated data storing instructions' fingerprints.

Various embodiments of the present disclosure enable updates to the software version without compromising the present approach. As a result, updates to the software are secure against rollback attacks. In an embodiment, the CPU utilizes a monotonic counter to track the software version. For example, the monotonic counter is hardcoded. In this example, the monotonic counter is embedded as a non-volatile register that stores a number. This number can only be increased as per the monotonicity property and in the event a software update is installed, the monotonic counter is increased, e.g., via a dedicated CPU instruction that increments the monotonic counter. In such cases, the CPU uses a cryptographic key generated by the key derivation function, which takes the monotonic counter into account, as described in above.

In an embodiment, a secure boot can be implemented, in addition to the enforced execution order. To that purpose, the hardware can embed the platform configuration register (PCR). The PCR can be regarded as a fixed-size register storing integrity measurements. Such integrity measurements are typically obtained in an output of a cryptographic hash function over the software content (e.g., binary). The PCR is reset to a suitable initial value when the CPU is reset (e.g., on reboot). The PCR cannot be written directly but can only be extended. For example, the value of the PCR can be replaced by the output of a cryptographic hash function that takes the current PCR value and a new value as arguments. In this example, the PCR value changes when new firmware/software is loaded to the memory. Consequently, a new cryptographic key is generated by the key derivation function. Also, the newly loaded software can only execute if the newly loaded software has been signed/encrypted with the key derived from the PCR value reflecting the boot order and the integrity of the boot software.

Various embodiments of the present disclosure enable obtaining attestations. The goal is for the hardware owner (or any other legitimate entity) to verify that the device runs an up-to-date software.

Now referring to FIGS. 3 and 6, in an example embodiment, the hardware owner derives S10 the key 31 based on correct values of the PCR values, the UID, and the monotonic counter MC, as illustrated in FIG. 3. A device of the hardware owner accordingly computes S20 the reference MACs, given instructions composing a software of interest. In this example, additional data (AD) and nonce values may need be computed S18-S19 first, as depicted in FIG. 6. Also, the device of the hardware owner places S30 the instructions and the reference MACs in the software, together with the additional data and the nonces, if desired. In the example, the software is stored S40 in the device 10, and the device 10 is ready for securely executing the software, as described in the flow of FIG. 4.

Now referring to FIGS. 4 and 6, various embodiments of the present disclosure secure execution on the device. In an example embodiment, executing the software on the device 10, the device 10 accesses S110 the software (as initially stored on the storage 11 of the device 10) to load S120 the instructions (possibly encrypted), the reference MACs, and any other desired data, such as additional data AD and nonce values N, to the memory 12. In this example, embodiment, the device 10 consecutively processes the instructions for verification and execution. The process ends when the last instruction has been processed (S130: Yes). Each time, device 10 selects S135 a new instruction, the device 10 verifies S150 the new instruction utilizing the key 32 derived at step S140, as explained earlier. The verification S150 relies on the reference MACs and other data (AD, N), if necessary. In one scenario, if the device 10 verifies (step S160: Yes) the current instruction, then device 10 executes S170 the instruction. In another scenario, if the device 10 does not verify (step S160: No) the current instruction, then the device 10 interrupts S180 the software execution.

In an alternative example embodiment, if the device 10 utilizes an AEAD scheme the verification S150 proceeds as shown in FIG. 6. For example, the device 10 utilizes the encrypted instructions C, the additional data AD, and the nonce values N to decrypt the instructions, using the key 32 derived at step S140. In this example, the device 10 not only utilizes the AEAD scheme to decrypt but also to prove the integrity and authenticity of each instruction.

Now referring to FIGS. 5, various embodiments of the present disclosure provide an attestation methodology that includes a sequence of steps to verify the current version of the software. In an embodiment, a verifying entity utilizes a legitimate entity 5 to assemble a request containing a nonce and send step S210 the request to the device 10. The device 10 receives the request at step S220. Next, at step S230, the device 10 signs a quote that includes the nonce, using the cryptographic key 32. The key 32 may already have been derived earlier, e.g., at step S140 of FIG. 4, and stored (possibly in a wrapped form) in the device 10. In one scenario, if the key is not derived earlier, then the key should be re-derived using the same KDF as described earlier. At step S240, the device 10 sends the signed quote to the legitimate entity 5. At step S250, legitimate entity 5 receives the signed quote and at step S260 verifies the signed quote using the key 31 derived using the same KDF. In the embodiment, the legitimate entity 5 can utilize data of the software instructions to derive the key 31, as done initially to store instructions in the software (see step S30 FIG. 3). At step S270, the legitimate entity 5 can extract the nonce included in the signed quote and compares the nonce with a corresponding expected value. As a result, the legitimate entity 5 can verify the current version of the software executing at the device 10.

The above scheme makes utilizes keys 31, 32 derived based at least in part on the UID and PCR values. In various embodiments of the present disclosure the quote may be encrypted at step S230 by the device 10 and then decrypted at step S260 by the legitimate entity 5. In addition, the device 10 and the legitimate entity 5 can rely on different cryptographic keys (i.e., distinct from the keys 31, 32) to sign/encrypt and then verify/decrypt the quote. For example, the key can be derived from the expected/current monotonic counter value. However, the present methods can provide improved security by tying the key to the UID and PCR value as well, hence the benefit of relying on the keys 31, 32. In another example, the legitimate entity 5 initially forms a request based on the PCR value, the expected monotonic counter value and/or the UID in addition to a nonce. As a result, any suitable cryptographic key shared by the device 10 and the legitimate entity 5 can be used to sign/encrypt the quote and then verify/decrypt the quote.

Referring now to FIG. 7, in an embodiment, the CPU successively fetches instructions from the instruction bus, which can also include any other required data, such as MACs, additional data, and nonce, and stored in cache (e.g., Instruction cache). The cache is considered to form part of the main memory, albeit closer to the CPU. In the embodiment, the CPU consecutively loads each instruction, together with other required data, into the CPU pipeline, to verify the instructions (e.g., Verify AEAD) utilizing an AEAD scheme, which uses a key derived from the PCR value, the UID, and the current monotonic counter value, as previously explained. Also, as the AEAD decryption proceeds, the CPU decodes each instruction (e.g., Decode) to a form that the CPU can execute (e.g., Execute). The decoding step is distinct from the AEAD decryption and verification process, which decrypts the instruction, and verifies integrity and authenticity of the instruction. Additionally, the CPU writes all results at the same stage of the pipeline (e.g., memory access, Memory, etc.). Outcomes of such executions can be passed to a data cache (e.g., Data cache) and then to the data bus (e.g., Data bus). Furthermore, when the instruction is executed and the instruction result is calculated, the CPU utilizes the commit unit to decides (e.g., Commit) when it is safe to store the result.

Depending on the CPU design, the pipeline may contain more or less stages, e.g., some stages may be combined. However, in the context of FIG. 7 it is vital that instructions are verified after fetching and before executing.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The present invention may be a method, a device, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other CPU pipeline may be devised, and the key derivation function may use additional data, in addition to the PCR value, the UID, and the monotonic counter values.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The "software" can be regarded as a collection of basic blocks with known correct control flow, which can be derived during compilation in form of a control flow graph or via symbolic execution. Each basic block is a list of instructions executing in order, ending with a branch instruction.

The "hardware" is an electronic device 10 equipped with at least a CPU and memory (read-only or dynamic memory).

The "hardware owner" is an entity owning the hardware or having legitimate access thereto.

The "binary" is a source code converted to an architecture-specific (ISA-specific) format, i.e., after the compilation and linking process. It consists of instructions and their respective memory addresses.

What is claimed is:

1. A computer implemented method for securely executing instructions of a software on a computerized device, the method comprising:
    accessing the software of the computerized device, wherein the software includes a plurality of instructions and respective reference message authentication codes (MACs);
    based on a shared encryption recipe, generating a cryptographic key at runtime based at least in part on a key derivation function, wherein arguments of the key derivation function are based at least in part on a unique identifier of the computerized device, a current value of a monotonic counter and a value extended from a measurement of a content of the software of an extension mechanism of a platform configuration register of the computerized device, the extension mechanism of the platform configuration register and the unique identifier of the computerized device establishing a chain of trust up to a runtime verification of the plurality of instructions;
    verifying an instruction of the plurality of instructions of the software based at least in part on the cryptographic key and a reference MAC of the respective reference MACs;
    in response to verifying the instruction of the plurality of instructions of the software, executing the instruction; and
    verifying a current version of the software based on the current value of the monotonic counter, the value extended from the measurement of the content, and a nonce.

2. The method of claim 1, wherein verifying the instruction of the plurality of instructions of the software, further comprises: computing a verification MAC corresponding to the instruction based at least in part on the cryptographic key; and comparing the verification MAC with the reference MAC.

3. The method of claim 1, wherein executing the instruction, further comprises: in response to failure to verify the instruction of the plurality of instructions of the software, interrupting execution of the instruction of the software.

4. The method of claim 3, wherein the respective reference MACs are MACs that have been computed based on an interdependency scheme, wherein the software further includes interdependency data reflecting the interdependency scheme, and wherein verifying the instruction is based on the interdependency scheme.

5. The method of claim 1, further comprising: encoding the plurality of instructions of the software based at least in part on an encryption algorithm using the key derivation function; and decoding the plurality of instructions of the software based at least in part on a decryption algorithm, wherein the decryption algorithm uses the generated cryptographic key and the reference MACs.

6. The method of claim 5, wherein the encryption algorithm and the decryption algorithm comply with an authenticated encryption with associated data algorithm, and wherein the software further includes additional data used to encrypt the plurality of instructions, wherein the decryption algorithm uses the additional data to decrypt and verify the plurality of instructions of the software.

7. The method of claim 1, wherein the arguments of the key derivation function include the value extended from the measurement of the content and an output of an intermediate function of the unique identifier.

8. The method of claim 1, wherein the monotonic counter increases monotonically with updates to the software.

9. The method of claim 8, wherein the arguments of the key derivation function include the value extended from the measurement of the content, an output of an intermediate function of the unique identifier, and the current value of the monotonic counter.

10. The method of claim 1, wherein the unique identifier is an identifier that is obtained from a physical unclonable function of the computerized device.

11. The method of claim 10, further comprising: obtaining the unique identifier from a dedicated circuit of a processing means of the computerized device, wherein the unique identifier is a unique identifier of the processing means of the computerized device.

12. The method of claim 1, further comprising: in response to booting the computerized device, measuring the content of the software; and extending the value based on the extension mechanism to obtain the extended value, wherein a processing means of the computerized device includes a dedicated, fixed-size memory implementing the platform configuration register.

13. The method of claim 1, wherein a module of a processing means of the computerized device perform the verification of the instruction.

14. The method of claim 1, further comprising: computing the reference MACs based on an initial cryptographic key derived using the key derivation function; storing the reference MACs together with the plurality of instructions in the software; and storing the software in the computerized device.

15. The method of claim 1, wherein the plurality of instructions included in the accessed software are machine code instructions that are directly interpretable by a processing means of the computerized device.

16. A computing system for securely executing instructions of a software on a computerized device, the computing system comprising:
    one or more computer processors;
    one or more computer readable storage devices; and stored program instructions on the one or more computer readable storage devices for execution by the one or more computer processors, the stored program instructions comprising:

program instructions to access the software of the computerized device, wherein the software includes a plurality of instructions and respective reference message authentication codes (MACs);

based on a shared encryption recipe, program instructions to generate a cryptographic key at runtime based at least in part on a key derivation function, wherein arguments of the key derivation function are based at least in part on a unique identifier of the computerized device, a current value of a monotonic counter and a value extended from a measurement of a content of the software of an extension mechanism of a platform configuration register of the computerized device, the extension mechanism of the platform configuration register and the unique identifier of the computerized device establishing a chain of trust up to a runtime verification of the plurality of instructions;

program instructions to verify an instruction of the plurality of instructions of the software based at least in part on the cryptographic key and a reference MAC of the respective reference MACs;

in response to verifying the instruction of the plurality of instructions of the software, program instructions to execute the instruction; and program instructions to verify a current version of the software based on the current value of the monotonic counter, the value extended from the measurement of the content, and a nonce.

17. The computer system according to claim 16, wherein verifying the instruction of the plurality of instructions of the software, further comprises: program instructions to compute a verification MAC corresponding to the instruction based at least in part on the cryptographic key; and program instructions to compare the verification MAC with the reference MAC.

18. The computer system according to claim 16, wherein executing the instruction, further comprises: in response to failure to verify the instruction of the plurality of instructions of the software, program instructions to interrupt execution of the instruction of the software.

19. The computer system according to claim 18, wherein the respective reference MACs are MACs that have been computed based on an interdependency scheme, wherein the software further includes interdependency data reflecting the interdependency scheme, and wherein verifying the instruction based on the interdependency scheme.

20. The computer system according to claim 16, the stored program instructions further comprising: program instructions to encode the instructions of the software based at least in part on an encryption algorithm using the key derivation function; and program instructions to decode the instructions of the software based at least in part on a decryption algorithm, wherein the decryption algorithm uses the generated cryptographic key and the reference MACs.

21. A computer program product for securely executing instructions of a software on a computerized device, the computer program product comprising one or more computer readable storage devices and collectively stored program instructions on the one or more computer readable storage devices, the stored program instructions comprising:

program instructions to access the software of the computerized device, wherein the software includes a plurality of instructions and respective reference message authentication codes (MACs);

based on a shared encryption recipe, program instructions to generate a cryptographic key at runtime based at least in part on a key derivation function, wherein arguments of the key derivation function are based at least in part on a unique identifier of the computerized device, a current value of a monotonic counter and a value extended from a measurement of a content of the software of an extension mechanism of a platform configuration register of the computerized device, the extension mechanism of the platform configuration register and the unique identifier of the computerized device establishing a chain of trust up to a runtime verification of the plurality of instructions;

program instructions to verify an instruction of the plurality of instructions of the software based at least in part on the cryptographic key and a reference MAC of the respective reference MACs;

in response to verifying the instruction of the plurality of instructions of the software, program instructions to execute the instruction; and program instructions to verify a current version of the software based on the current value of the monotonic counter, the value extended from the measurement of the content, and a nonce.

22. The computer program product according to claim 21, wherein the arguments of the key derivation function include the monotonic counter set to monotonically increase with updates to the software.

* * * * *